US008841585B2

(12) United States Patent
Offermann et al.

(10) Patent No.: US 8,841,585 B2
(45) Date of Patent: Sep. 23, 2014

(54) TRANSPARENT ARTICLE WHICH CAN BE ELECTRICALLY EXTENSIVELY HEATED, METHOD FOR THE PRODUCTION THEREOF AND THE USE THEREOF

(75) Inventors: Volkmar Offermann, Eschweiler (DE); Alwin Timmermann, Köln (DE)

(73) Assignee: Saint-Gobain Glass France (FR)

( * ) Notice: Subject to any disclaimer, the term of this patent is extended or adjusted under 35 U.S.C. 154(b) by 373 days.

(21) Appl. No.: 13/377,414

(22) PCT Filed: Jun. 23, 2010

(86) PCT No.: PCT/EP2010/058876
§ 371 (c)(1),
(2), (4) Date: Dec. 9, 2011

(87) PCT Pub. No.: WO2011/006743
PCT Pub. Date: Jan. 20, 2011

(65) Prior Publication Data
US 2012/0103961 A1    May 3, 2012

(30) Foreign Application Priority Data

Jul. 17, 2009  (DE) .......................... 10 2009 026 200

(51) Int. Cl.
*B60L 1/02*       (2006.01)
*B32B 17/10*     (2006.01)
*H05B 3/84*      (2006.01)
*B21D 39/03*     (2006.01)

(52) U.S. Cl.
CPC ............ *H05B 3/84* (2013.01); *H05B 2203/013* (2013.01); *B32B 17/10036* (2013.01); *H05B 2203/016* (2013.01); *B32B 17/10192* (2013.01); *H05B 2203/008* (2013.01)

USPC .............................. 219/203; 219/201; 29/428

(58) Field of Classification Search
USPC ................. 219/203, 201, 213–4, 202, 218–9; 29/428
See application file for complete search history.

(56) References Cited

U.S. PATENT DOCUMENTS

| 6,045,896 A | 4/2000 | Boire et al. |
| 6,559,419 B1 | 5/2003 | Sol et al. |
| 6,734,396 B2 | 5/2004 | Sol et al. |

FOREIGN PATENT DOCUMENTS

| EP | 0847965 | | 6/1998 |
| EP | 1908584 | | 4/2008 |
| GB | 2381179 | * | 4/2003 |
| WO | 00/72635 | | 11/2000 |
| WO | 03/015473 | | 2/2003 |
| WO | 03/024155 | | 3/2003 |
| WO | 03024155 | * | 3/2003 |

OTHER PUBLICATIONS

PCT International Search Report issued for PCT/EP2010/055876 filed Jun. 23, 2010 in the name of Saint-gobain Glass France (German and English).
PCT International Preliminary Report on Patentability issued on Feb. 21, 2012 for PCT/EP2010/058876 filed Jun. 23, 2010 in the name of Saint-Gobain Glass France (German and English).

* cited by examiner

*Primary Examiner* — Shawntina Fuqua
(74) *Attorney, Agent, or Firm* — Steinfl & Bruno LLP (57) ABSTRACT

An electrically heatable, transparent article and a method for fabricating such article are described. The article comprises an electrically conductive transparent coating and a transparent substrate. The coating is in contact with electrical bus bars and delimits a localized region, which contains a coating-free transparent region.

17 Claims, 7 Drawing Sheets

```
┌─────────────────────────────────────────┐
│ Extensive application of a silver-containing layer (3) │
│ with a thickness of 9 nm by sputtering onto a │
│ transparent, electrically insulating substrate (2) and │
│ creation of at least one transparent, electrically │
│ conductive coating (silver-containing layer) (3) and at │
│ least one spatially bounded transparent region (5) │
│ free of the silver-containing layer (3), consequently, │
│ without a silver-containing layer, that is positioned at │
│ least partially in contact with the silver-containing │
│ layer (3). │
└─────────────────────────────────────────┘
                    ↓
┌─────────────────────────────────────────┐
│ Electrical contacting of the silver-containing layer (3) │
│ with two electrical collection strips (4.1 and 4.2). │
└─────────────────────────────────────────┘
                    ↓
┌─────────────────────────────────────────┐
│ Introduction of electrical separation lines (7.1)(7.2) by │
│ lasers parallel to the electric field lines (115.1)(115.2). │
└─────────────────────────────────────────┘
                    ↓
┌─────────────────────────────────────────┐
│ Delimitation of a region (100) from the silver-containing │
│ layer (3) by forming electrically conductive collection │
│ regions (6.1) (6.2) with a silkscreening process parallel │
│ to equipotential lines (110.1)(110.2) on the silver- │
│ containing layer (3) between the two separation lines │
│ (7.1)(7.2). │
└─────────────────────────────────────────┘
                    ↓
┌─────────────────────────────────────────┐
│ Electrical contacting of the electrically conductive │
│ collection regions (6.1)(6.2) via an ohmic resistor (8). │
└─────────────────────────────────────────┘
```

Fig. 7

TRANSPARENT ARTICLE WHICH CAN BE ELECTRICALLY EXTENSIVELY HEATED, METHOD FOR THE PRODUCTION THEREOF AND THE USE THEREOF

CROSS REFERENCE TO RELATED APPLICATIONS

The present application is the US national stage of International Application PCT/EP2010/058876 filed on Jun. 23, 2010, which in turn, claims priority to German Patent Application No. 10 2009 026 200.8 filed on Jul. 17, 2009.

PRIOR ART

The present invention relates to a new, electrically extensively heatable, transparent article, comprising a transparent, electrically insulating substrate with an extensive, electrically conductive, transparent coating, including at least one localized transparent region free of the electrically conductive coating. Moreover, the present invention relates to a new method for production of an electrically extensively heatable, transparent article.

And, not least, the present invention relates to the new use of the new transparent article, comprising a transparent, electrically insulating substrate with an electrically extensively heatable, transparent coating, including at least one localized transparent region free of the electrically conductive coating, as well as the electrically extensively heatable, transparent article, with a transparent substrate with an extensive, electrically conductive, transparent coating, that includes at least one localized transparent region free of the electrically conductive coating produced using the new method.

From European Patent EP 1 183 912 B1, an automotive glazing panel or pane, in particular, a windshield, with a transparent, electrically extensively heatable coating for sun protection or for solar control or solar regulation is known. The electrically heatable coating is connected to two electrical bus bars that transmit the electrical power to the electrically heatable coating. This known windshield has at least one data transmission window or so-called camera field or sensor field through which a camera or a sensor can "look through" the windshield. This window or field is positioned in partial contact with the electrically extensively heatable coating. However, the homogeneity of the electric field in the extensive, electrically conductive coating is destroyed by this discrete spot. This can create hot and cold spots in the windshield that cause thermal stresses that can result in damage to the windshield and/or light spots that can interfere with vision.

The European Patent EP 1 183 912 B1 attempts to counter this serious problem in that at least one portion of the periphery of the discrete spot is bounded by an electrically conductive band that is connected with a collection strip and that has an electrical resistivity that is significantly lower than the electrical resistivity in ohms per square of the extensive, electrically conductive coating. In particular, the electrically conductive band should have an electrical resistance of <0.35 and, in particular, <0.05 ohms per square.

In U.S. Pat. No. 6,734,396 B2, a heatable motor vehicle window pane with a data transmission window is described, wherein a common bottom collection strip is positioned opposite a plurality of separated top bus bars. Between the top bus bars and the common bottom collection strip, different voltages generated by a plurality of voltage sources are applied.

In U.S. Pat. No. 6,559,419 B1, a heatable motor vehicle window pane with a data transmission window is described, wherein the electrically conductive coating is divided into a plurality of regions electrically isolated from each other. The regions have one common top collection strip and one common bottom collection strip between which the heating voltage is applied.

Although through this measure, the homogeneity of the electric field can be improved and the formation of hot and cold spots and/or light spots can be suppressed to a certain extent, the level achieved is not completely satisfactory, but requires further improvement.

The object of the present invention is to eliminate the disadvantages of the prior art and, in particular, to further improve the automobile glazing panels or panes known from the European Patent EP 1 183 912 B1, in particular, windshields, relative to the homogeneity of the electric field and the suppression of the formation of hot and cold spots, in order to effectively prevent damage to the panes through thermal stresses and/or interference with vision due to light spots.

The object of the present invention is to make available a new, electrically extensively heatable, transparent article, in particular a new laminated safety glass pane, especially a windshield.

A further object of the present invention is to make available a new, improved method for production of an electrically extensively heatable, transparent article, in particular, a laminated safety glass pane, especially a windshield.

A further object of the present invention is to find a new use for the new, improved, electrically extensively heatable, transparent article in a means of transportation for land, air, and water traffic as well as in the construction, furniture, and equipment sector. In the relevant electrically extensively heatable, transparent article, upon application of electrical voltage, a homogeneous or substantially homogeneous electric field without hot and cold spots should be formed such that thermal stresses and/or light spots can no longer occur.

The object of the present invention is accomplished by an electrically extensively heatable, transparent article, comprising:
- at least one extensive, electrically conductive, transparent coating on a transparent substrate that is in electrical contact with two electrical bus bars for transmitting electrical power,
- at least one localized region delimited from the coating, and
- at least one localized transparent region free of the electrically conductive coating, within the delimited region,
- wherein the delimited region is at least partially bounded by
- at least two current collection regions, running parallel to equipotential lines and connected via at least one ohmic resistor, on the coating, and
- at least two electrically insulating separation lines, running parallel to electric field lines.

The electrically extensively heated, transparent article according to the invention can be delivered in large quantities in a simple and quite readily reproducible manner, with the transparent coating having an electrically conductive material. In the extensive, electrically conductive coating, there is at least one localized transparent region free of the electrically conductive coating, in particular a camera field or sensor field, whose periphery is at least partially surrounded by an electrically conductive strip whose resistivity in ohms per square is substantially lower than the resistivity in ohms per square of the extensive, electrically conductive coating.

The electrically extensively heatable, transparent article according to the invention is significantly improved in particular with regard to the homogeneity of electric field and the suppression of the formation of a cold spots in order to effectively prevent damage to the panes through thermal stresses and/or interference with vision due to light spots.

A preferred embodiment of the invention is an electrically extensively heatable, transparent article, wherein the potentials of the current collection regions and potentials of the adjacent equipotential lines are the same.

A preferred embodiment of the invention is an electrically extensively heatable, transparent article, wherein at least one current collection region includes at least partially a current collection strip.

A preferred embodiment of the invention is an electrically extensively heatable, transparent article, wherein the ohmic resistor as an electrical sheet resistivity of 0.1 ohms per square to 100 ohms per square.

A preferred embodiment of the invention is an electrically extensively heatable, transparent article, wherein the ohmic resistor includes a silver-containing silkscreening paste.

A preferred embodiment of the invention is an electrically extensively heatable, transparent article, wherein the ohmic resistor is formed from a subregion of the coating within the region.

A preferred embodiment of the invention is an electrically extensively heatable, transparent article, wherein the ohmic resistor is included in a discrete electrical component or a heating wire.

A preferred embodiment of the invention is an electrically extensively heatable, transparent article, wherein the electrical separation lines have a width of 50 µm to 20 mm.

A preferred embodiment of the invention is an electrically extensively heatable, transparent article, wherein the electrically conductive current collection regions have a width of 100 µm to 20 mm.

In a preferred embodiment of the invention, the ohmic resistor, which connects the current collection regions, is dimensioned such that below a defined heating current density, the voltage drop across the ohmic resistor adapts the potential of the current collection regions to the potential of the equipotential lines. The ohmic resistor is arranged in the region of a data transmission window such that the Joule heat loss of the ohmic resistor protects the data transmission window against condensation and icing.

The object of the present invention is further accomplished through a method for producing an electrically extensively heatable, transparent article, wherein
(I) an electrically conductive material is applied extensively on a transparent, electrically insulating substrate, wherein at least one transparent, electrically conductive coating and at least one localized transparent region, free of the electrically conductive coating, which is positioned at least partially in contact with the coating, is created,
(II) the coating is electrically contacted with two electrical bus bars,
(III) electrical separation lines are inserted into the coating parallel to the electric field lines,
(IV) electrically conductive current collection regions are formed on the coating between the two separation lines parallel to the equipotential lines and a region separated from the coating is formed, and
the electrically conductive current collection regions are connected via at least one ohmic resistor.

The electrically extensively heatable, transparent articles produced using the new method are significantly improved, particularly with regard to the homogeneity of the electric field and the suppression of the formation of hot and cold spots. Damage to the article through thermal stresses and/or interference with vision by light spots is effectively prevented.

A preferred embodiment of the invention is a method, wherein at least one electrically conductive current collection region is applied on the coating in a silkscreening process.

A preferred embodiment of the invention is a method, wherein the electrical separation lines and are inserted into the coating with a laser cut or by mechanical abrasion.

A preferred embodiment of the invention is a method, whereby the ohmic resistor, which connects the current collection regions, is dimensioned such that below a defined heating current density, the voltage drop across the ohmic resistor adapts the potential of the current collection regions to the potential of the equipotential lines. The ohmic resistor is arranged in the region of a data transmission window such that the Joule heat loss of the ohmic resistor protects the data transmission window against condensation and icing.

The object of the present invention is further accomplished through a use of the electrically extensively heatable, transparent article in means of transportation for land, air, and water traffic as well as in the furniture, equipment, and construction sector.

A preferred embodiment of the invention is a use of the electrically extensively heatable, transparent article in means of transportation for traffic with driver assistance systems.

Figure 1:
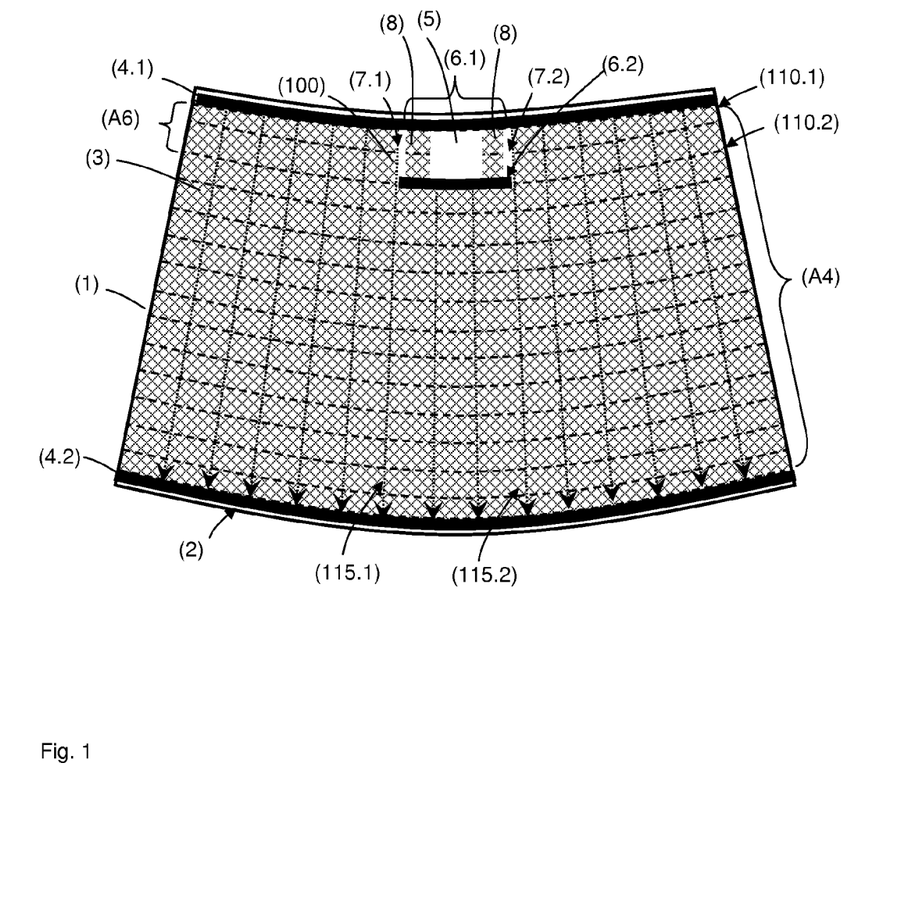

In the following, the article according to the invention is explained by way of example with reference to FIGS. 1 and 6. FIG. 1 through 6 are schematic depictions intended to illustrate the principle of the invention. The method according to the invention is explained by way of example in FIG. 7.

EXEMPLARY EMBODIMENTS

Figure 2:
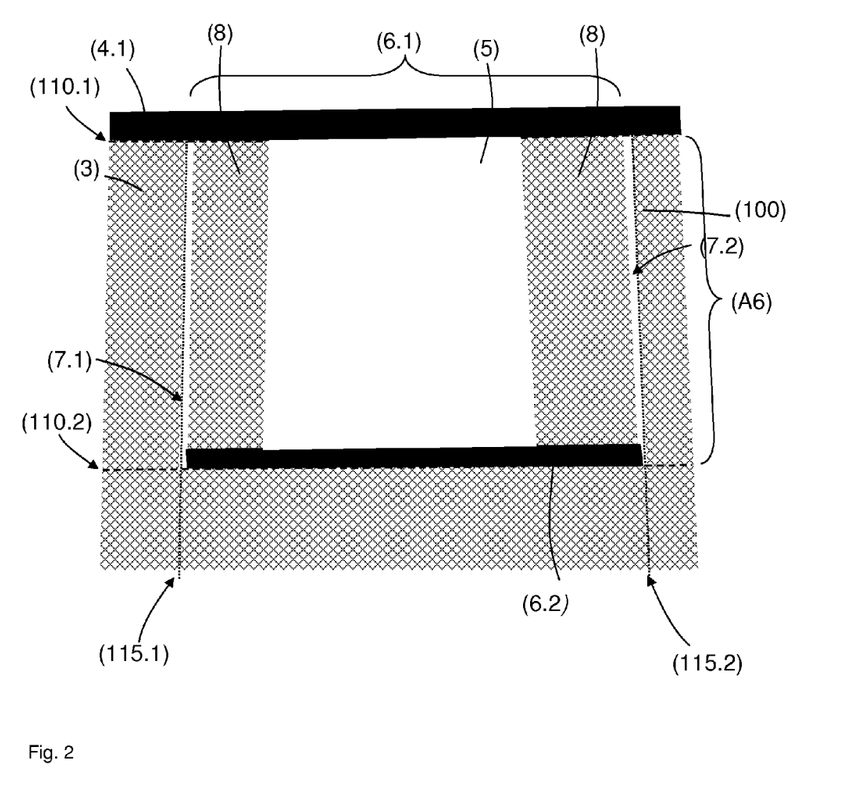
Figure 3:
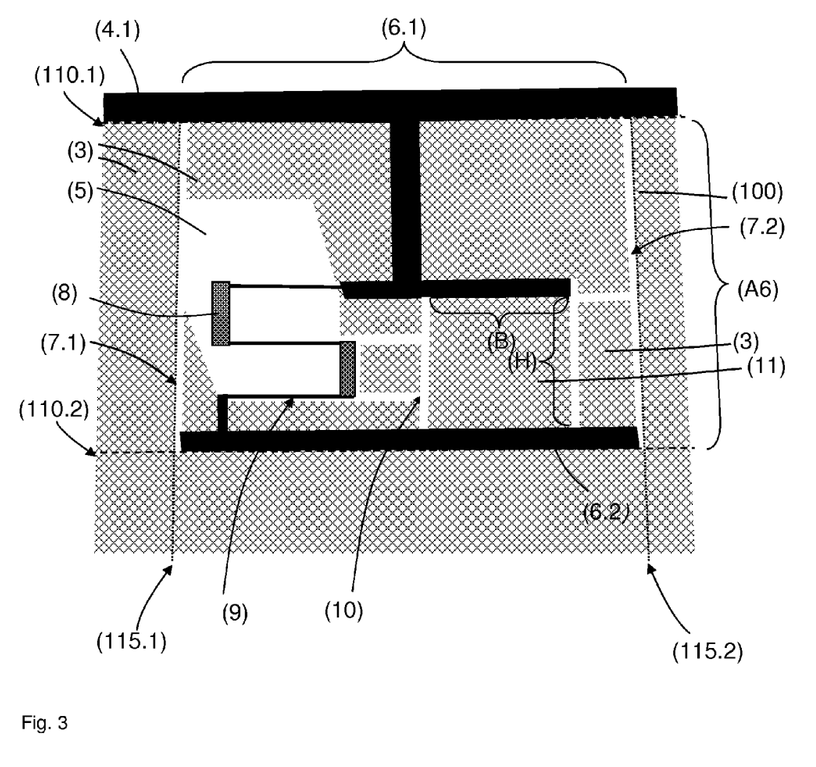
Figure 4:
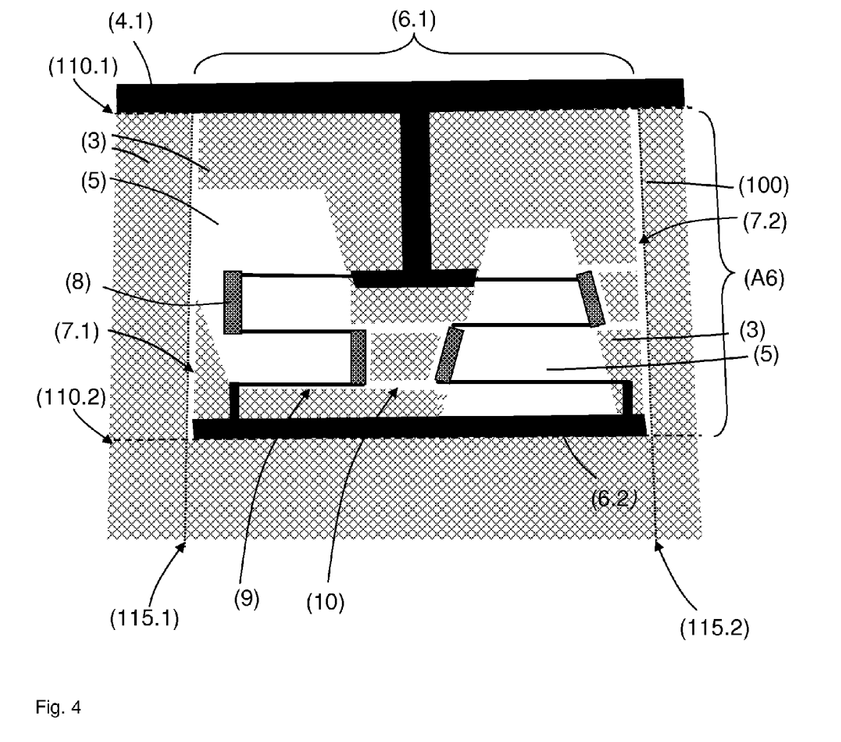
Figure 5:
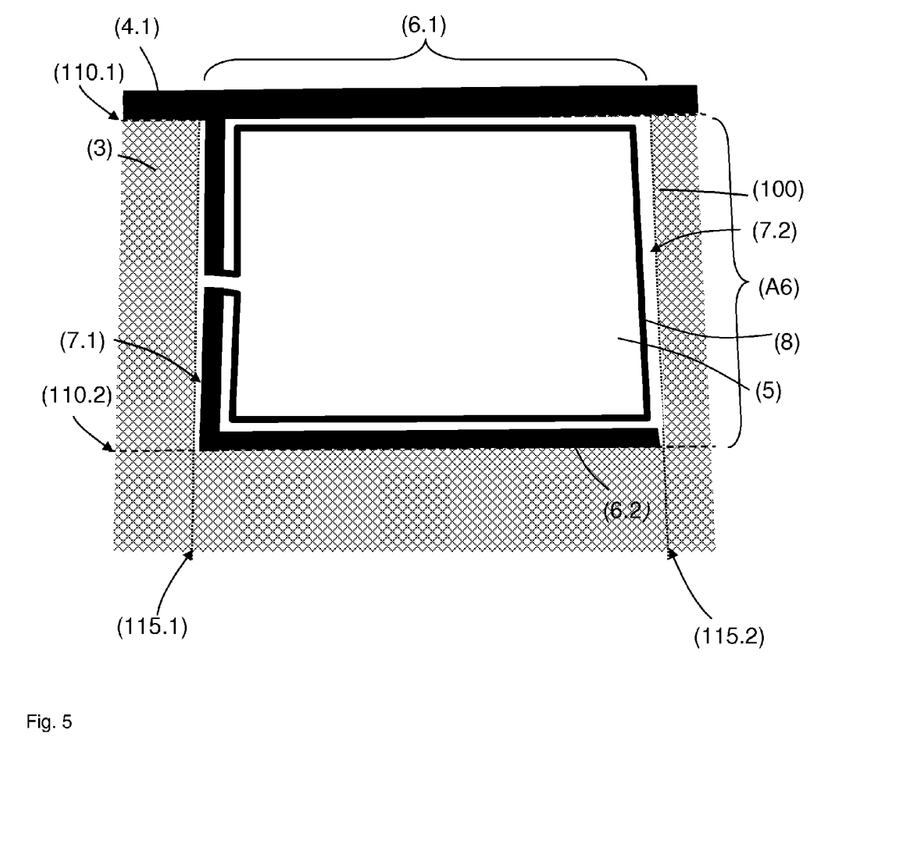
Figure 6:
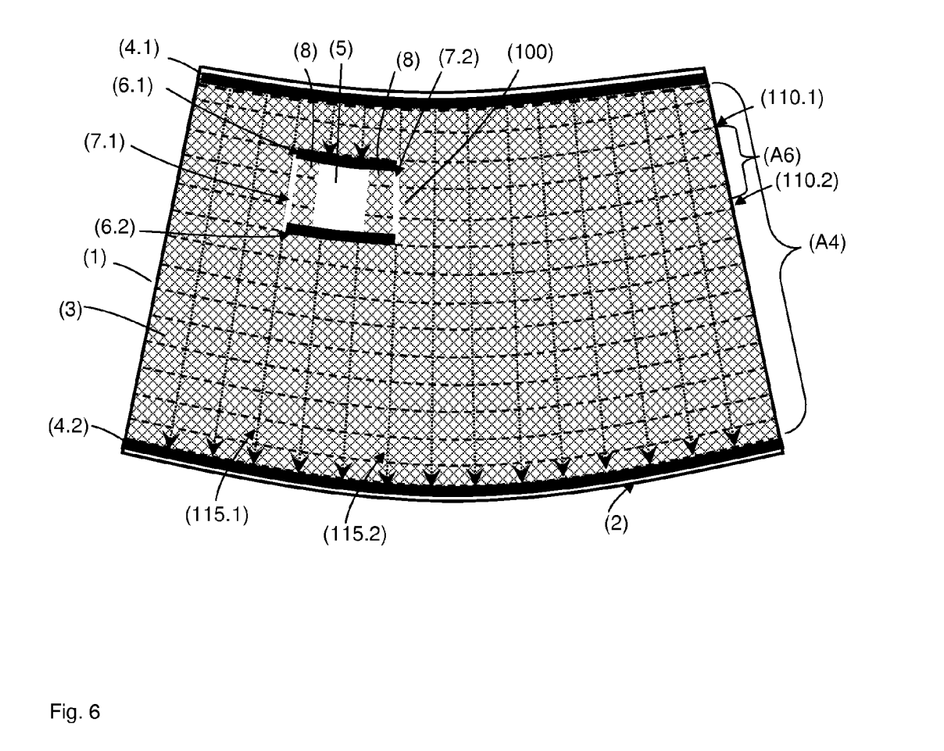
Figure 7:
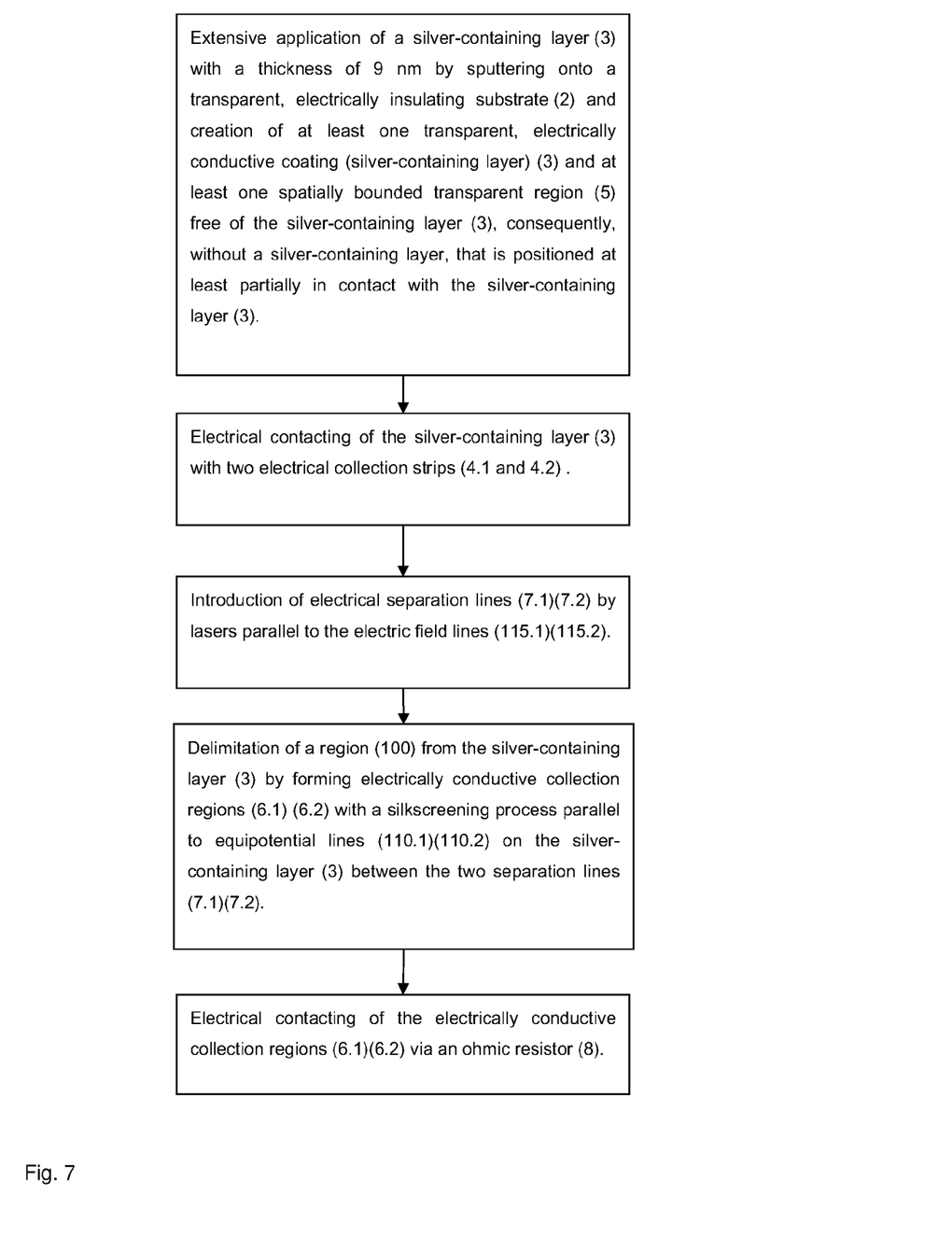

The figures depict
FIG. 1 a plan view of the first embodiment of the invention,
FIG. 2 a detailed view of the first embodiment of the invention,
FIG. 3 a detailed view of a second embodiment,
FIG. 4 a detailed view of a third embodiment,
FIG. 5 a detailed view of a fourth embodiment,
FIG. 6 a plan view of another embodiment of the invention, and
FIG. 7 a flow diagram of an exemplary embodiment of the method according to the invention.

The substrates (2) according to the embodiments of FIG. 1 through 6 are float glass panes of dimensions as they are used, for example, for windshields.

The coatings (3) according to the embodiments of FIG. 1 through 6 are in each case a coating, as are described in the German translation of the European patent EP 0 847 965 B1 with the file number DE 697 31 2 168 T2, Example 1, page 9, par. [0063], through page 11, par. [0080]. They are preferably silver-containing layers. The preferred sheet resistivity of the coating (3) is, for example, 0.5 ohms per square to 1.5 ohms per square at a voltage of 12 volts to 15 volts. Motor vehicle windshields with such layer systems must have, overall, light transmission at least equal to or greater than 70%.

FIG. 1 depicts a plan view of a windshield (1) according to the invention. The coating (3) was electrically contacted on the top and bottom edge of the windshield with electrical bus bars (4.1) (4.2). The electric potential difference between the top and bottom electrical bus bars (4.1) (4.2) was, for example, 14 V. Equipotential lines (110) were defined parallel to the electrical bus bars; electric field lines (115) were defined perpendicular to the equipotential lines. The windshield (1) included at the top edge a data transmission window (5) with increased transmission for infrared radiation, for example.

For better representation, FIG. 2 depicts a detail of the windshield (1) from FIG. 1 in the region of the data transmission windows (5).

To obtain high transmission of infrared radiation for data transmission, no electrically conductive coating (3) was present in the region of the data transmission windows (5). The data transmission windows were located within a region (100) separated from the electrically conductive transparent coating (3). The equipotential lines (110) and electric field lines (115) were defined for a state of the heated windshield (1), in which no data transmission windows (5) and no delimited region (100) were present. The area of the delimited region (100) was established by two equipotential lines (110.1) (110.2) and two electric field lines (115.1) (115.2).

Parallel to the equipotential lines (110.1) and (110.2), the region (100) was bounded by a current collection region (6.2) and a subregion (6.1) of the current collection strip (4.1). Parallel to the electric field lines (115.1) (115.2), the region (100) was bounded by electrically insulating separation lines (7.1) (7.2). The distance (A6) between the current collection regions (6.1, 6.2) was $1/7$ of the distance (A4) between the electrical bus bars (4.1) and (4.2). The necessary potential difference between the current collection regions (6.1) and (6.2) to match the equipotential lines (110.1) (110.2) was thus $14V \times 1/7 = 2$ V. The current collection regions (6.1) (6.2) were electrically contacted across ohmic resistors (8) within the region (100). In the exemplary embodiment, the ohmic resistors (8) were film resistors, implemented as separated regions of the coating (3) within the region (100). The electrical bus bars (4.1) and (4.2) and the current collection regions (6.1) and (6.2) included a 20-100 µm thick commercial silver-based conductive paste printed on. The width of the current collection region (6.2) was 10 mm. The width of the electrical bus bars (4.1) and (4.2) and thus also the current collection region (6.1) was 5 mm.

The ohmic resistor (8) was dimensioned such that below a defined heating current density, the voltage drop across the ohmic resistor (8) was 2V. Thus, the electric potential of the current collection region (6.2) could be adapted to the potential of the equipotential line (110.2). The effect was to achieve a very high homogeneity of heat output over the windshield surfaces (1) outside the region (100).

In FIG. 3 through 5, embodiments of the region (100) with the data transmission windows are depicted. Here, the ohmic resistor (8) was implemented in the region (100) such that it was particularly suited for heating the data transmission windows (5). The current collection regions (6.1) and (6.2) were electrically contacted across ohmic resistors (8) within the region (100).

In the exemplary embodiment in FIG. 3, a first ohmic resistor (8) was implemented for heating as a subregion (11) of the coating (3) by electrical separation lines (10). By coordinating the height (H) and width (B) with the specific sheet resistivity of the coating (3) and the heating current, the necessary voltage drop of 2 V was obtained. The voltage drop is calculated according to Ohm's law from the multiplication of the specific sheet resistivity, the heating current, and the quotient of height (H) and width (B) of the subregion (11). In addition, an ohmic resistor (8) of a silver-containing screen print was electrically contacted via electric contact lines (9) with the current collection regions (6.1) and (6.2). After calibration of the parallel connected ohmic resistors (8, 11), the necessary voltage drop of 2 V was obtained between the current collection regions (6.1) and (6.2) and, in particular, a heating function was also obtained within the region (100).

Thus, it was possible to adapt the electric potential of the current collection regions (6.2) to the potential of the equipotential line (110.2). A very high homogeneity of heat output over the windshield surfaces (1) outside the region (100) was obtained. The resistors (8) were also arranged in the region (100) relative to the data transmission window (5) such that the Joule heat loss of the ohmic resistors (8) protected the data transmission window (5) against condensation and icing.

FIGS. 4 and 5 depict other embodiments of the region (100) of a windshield (1) according to the invention.

In the exemplary embodiment of FIGS. 4 and 5, the ohmic resistors (8) were implemented from silver-containing screen printing with a defined ohmic resistance and electrically contacted via electric contact lines (9) with the current collection regions (6.1) and (6.2). The width of the current collection regions (6.2) was 5 mm. The electric contact lines (9) had a width of 100 µm. Alternatively, the ohmic resistors (8) can also be introduced in hybrid form, e.g., as heating wires or discrete electrical components.

FIG. 6 depicts a view of a windshield (1) according to the invention. The embodiment differed from the exemplary embodiment according to FIG. 1 in that the current collection region (6.1) was not a subregion of the current collection strip (4.1). The region (100) with the data transmission window (5) could thus be freely arranged in the region of the coating (3) between the electrical bus bars (4.1) and (4.2). The necessary voltage drop of, for example, 3 V between the current collection regions (6.1) and (6.2) to match the equipotential lines (110.1) and (110.2) could likewise be obtained by adaptation of the ohmic resistors (8) to the heating current density. The effect was to achieve a very high homogeneity of heat output over the windshield surfaces (1) outside the region (100).

The embodiments according to the invention were in each case reliably bonded to each other with an adhesive film made of polyvinyl butyral PVB (not shown) and a float glass pane (not shown) using a pre-bonding method (calender rolling, serpentine, or vacuum compaction method) and an autoclave method, such that a typical structure for a laminated safety glass pane resulted.

Upon application of an electrical voltage of, for example, 14 V to the bus bars (4.1) and (4.2), a current flows homogeneously through the coating (3), whereby the windshield is heated to 50° C., without hot and cold spots or light spots forming. In the separated region (100), moisture condensation and icing of the data transmission window (5) were minimized through a localized heating of the ohmic resistors (8).

In FIG. 1 through 5, the reference characters have the following meaning:
(1) Transparent article (windshield)
(2) Transparent, electrically insulating substrate,
(3) Electrically conductive, transparent coating,
(4) Bus bar,
(4.1) Bus bar,
(4.2) Bus bar,
(5) Data transmission window,
(6) Collection region,
(6.1) Collection region,
(6.2) Collection region,
(7) Electrically insulating separation line,
(7.1) Electrically insulating separation line,
(7.2) Electrically insulating separation line,
(8) Ohmic resistor,
(9) Electric contact line,
(10) Electric separation line in the region (100), (11) Subregion of the region (100) as an ohmic resistor,
(100) Delimited region,
(110) Equipotential line,
(110.1) Equipotential line,
(110.2) Equipotential line,
(115) Electric field line,
(115.1) Electric field line,
(115.2) Electric field line,
(A4) Distance between the bus bars,
(A6) Distance between the collection regions

The invention claimed is:

1. An electrically heatable, transparent article, comprising:
at least one, electrically conductive, transparent coating on a transparent substrate that is in electrical contact with two electrical bus bars for transmitting electrical power,
at least one localized delimited region, delimited by the coating, and
at least one localized transparent region free of the coating, within the delimited region, wherein the delimited region is at least partially bounded by
at least two current collection regions, running parallel to equipotential lines and connected via at least one ohmic resistor, on the coating, and
at least two electrically insulating separation lines, running parallel to electric field lines.

2. The article according to claim 1, wherein at least one current collection region of the at least two current collection regions includes at least partially one electrical bus bar of said two electrical bus bars.

3. The article according to claim 1, wherein the ohmic resistor has an electrical sheet resistivity of 0.1 ohms per square to 100 ohms per square.

4. The article according to claim 1, wherein the ohmic resistor includes a silver-containing screen printing paste.

5. The article according to claim 1, wherein the ohmic resistor is formed from a subregion of the coating within the delimited region.

6. The article according to claim 1, wherein the ohmic resistor is contained in a discrete electrical component or a heating wire.

7. The article according to claim 1, wherein the electrically insulating separation lines have a width of 50 μm to 20 mm.

8. The article according to claim 1, wherein the current collection regions have a width of 1 mm to 20 mm.

9. The article according to claim 1, wherein the at least one ohmic resistor, is dimensioned such that below a defined heating current density, a voltage drop across the at least one ohmic resistor adapts a potential of the current collection regions to a potential of the equipotential lines, the localized, transparent region comprising a data window, the at least one ohmic resistor being arranged in the delimited region such that a Joule heat loss of the at least one ohmic resistor protects the data transmission window against condensation and icing.

10. A method for fabricating an electrically heatable, transparent article, comprising
applying an electrically conductive material on a transparent, electrically insulating substrate, thus forming at least one transparent, electrically conductive coating and at least one localized transparent region, free of the electrically conductive coating, said localized transparent region being positioned at least partially in contact with the coating,
electrically contacting the coating with two electrical bus bars,
inserting electrical separation lines into the coating parallel to electric field lines,
forming electrically conductive current collection regions on the coating between the electrical separation lines parallel to equipotential lines, and forming a delimited region separated from the coating, and
connecting the electrically conductive current collection regions via at least one ohmic resistor.

11. The method according to claim 10, wherein at least one electrically conductive current collection region is applied on the coating in a silkscreening process.

12. The method according to claim 10, wherein the electrical separation lines are inserted into the coating with a laser cut or by mechanical abrasion.

13. The method according to claim 10, wherein the at least one ohmic resistor, is dimensioned such that below a defined heating current density, a voltage drop across the at least one ohmic resistor adapts a potential of the current collection regions to a potential of the equipotential lines, the localized transparent region comprising a data transmission window, the at least one ohmic resistor being arranged in the delimited region such that Joule heat loss of the at least one ohmic resistor protects the data transmission window against condensation and icing.

14. A method comprising:
using the electrically heatable, transparent article according to claim 1 in means of transportation for land, air, and water traffic as well as in furniture, equipment, or construction sectors.

15. The method of claim 14, comprising:
using the electrically heatable, transparent article in means of transportation for traffic with driver assistance systems.

16. The article according to claim 1, wherein a distance between the at least two current collection regions is 1/7 of a distance between the two electrical bus bars.

17. The article according to claim 1, wherein a voltage drop across the at least one ohmic resistor is 2 V.

* * * * *